(12) United States Patent
Miyamoto

(10) Patent No.: US 7,013,041 B2
(45) Date of Patent: Mar. 14, 2006

(54) IMAGE DATA TRANSMITTING APPARATUS AND METHOD OF CONTROLLING SAME

(75) Inventor: Takashi Miyamoto, Asaka (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 680 days.

(21) Appl. No.: 10/162,686

(22) Filed: Jun. 6, 2002

(65) Prior Publication Data

US 2002/0196971 A1    Dec. 26, 2002

(30) Foreign Application Priority Data

Jun. 25, 2001    (JP)    ............... 2001-190840

(51) Int. Cl.
 G06K 9/36    (2006.01)
(52) U.S. Cl. .................................... 382/166
(58) Field of Classification Search ........ 382/162–163, 382/166, 167, 305, 239, 232–233, 237, 168; 358/1.9, 3.23, 518, 520, 523, 537, 1.15–1.16; 345/589–593, 597–605; 455/412.1, 566, 455/550.1, 414, 556.1–556.3; 715/764; 709/247, 709/216

See application file for complete search history.

(56) References Cited

U.S. PATENT DOCUMENTS

| | | | | |
|---|---|---|---|---|
| 5,625,759 A | * | 4/1997 | Freeman | ............... 358/1.15 |
| 6,061,473 A | * | 5/2000 | Chen et al. | ............... 382/235 |
| 6,518,981 B1 | * | 2/2003 | Zhao et al. | ............... 715/764 |

OTHER PUBLICATIONS

Pei et al., Color Image Compression and Limited Display Using Self-Organization Kohonen Map, IEEE 1051-8215/98, 191-205.*

* cited by examiner

Primary Examiner—Joseph Mancuso
Assistant Examiner—Ishrat Sherali
(74) Attorney, Agent, or Firm—Birch, Stewart, Kolasch & Birch, LLP

(57) ABSTRACT

The amount of data in an image file transmitted to a cellular telephone is reduced. To achieve this, the colors of pixels constituting an image represented by image data are specified by a color palette table. Color palettes representing colors that do not appear in the image are deleted from the color palette table. Since the amount of data in the color palette table contained in the image file is reduced, so is the amount of image data in the image file.

2 Claims, 5 Drawing Sheets

Fig. 3

(A) BEFORE DELETION OF COLOR PALETTES

| OLD PALETTE NO. | R | G | B |
|---|---|---|---|
| 0 | 0 | 0 | 0 |
| 1 | 0 | 0 | 5 |
| 2 | 0 | 5 | 0 |
| 3 | 5 | 0 | 0 |
| 4 | 0 | 0 | 10 |
| 5 | 0 | 10 | 0 |
| ⋮ | ⋮ | ⋮ | ⋮ |
| 94 | ... | ... | ... |
| 95 | ... | ... | ... |
| 96 | ... | ... | ... |
| ⋮ | ⋮ | ⋮ | ⋮ |
| 119 | ... | ... | ... |
| 120 | ... | ... | ... |
| 121 | ... | ... | ... |
| ⋮ | ⋮ | ⋮ | ⋮ |
| 152 | ... | ... | ... |
| 153 | ... | ... | ... |
| 154 | ... | ... | ... |
| ⋮ | ⋮ | ⋮ | ⋮ |
| 194 | ... | ... | ... |
| 195 | ... | ... | ... |
| 196 | ... | ... | ... |
| ⋮ | ⋮ | ⋮ | ⋮ |
| 254 | 250 | 255 | 255 |
| 255 | 255 | 255 | 255 |

95–120 }DELETE
153–195 }DELETE (B) AFTER DELETION OF COLOR PALETTES

| NEW PALETTE NO. | R | G | B |
|---|---|---|---|
| 0 | 0 | 0 | 0 |
| 1 | 0 | 0 | 5 |
| 2 | 0 | 5 | 0 |
| 3 | 5 | 0 | 0 |
| 4 | 0 | 0 | 10 |
| 5 | 0 | 10 | 0 |
| ⋮ | ⋮ | ⋮ | ⋮ |
| 185 | 250 | 255 | 255 |
| 186 | 255 | 255 | 255 |

IMAGE DATA TRANSMITTING APPARATUS AND METHOD OF CONTROLLING SAME

BACKGROUND OF THE INVENTION

1. Field of the Invention

This invention relates to an apparatus for transmitting image data to an electronic device such as a cellular telephone, and to a method of controlling this apparatus.

2. Description of the Related Art

There are increasing numbers of cellular telephones in use that are capable of displaying the color images of Web pages on the display screen of a display device by accessing a server via the Internet. Color palettes that specify the colors of pixels constituting an image are utilized to display the color image on the display screen of the cellular telephone. In a case where a color image of 256 colors is displayed, a corresponding relationship between color pallet numbers of 0 to 255 and RGB ratios corresponding to these color pallet numbers (where the ratios are the color palettes) is defined by a color palette table.

The color palette table and the corresponding image data are stored in the same file and the file is transmitted from an image server to the cellular telephone as a color image file.

However, since the data receiving capacity of a cellular telephone is comparatively small, there are occasions where color image files transmitted from an image server cannot be received.

Accordingly, it is required that the amount of data in a color image file transmitted to an electronic device such as a cellular telephone be small.

DISCLOSURE OF THE INVENTION

An object of the present invention is to reduce the amount of data in a color image file transmitted to an electronic device.

According to the present invention, the foregoing object is attained by providing an image data transmitting apparatus comprising a calculation device for calculating frequency of appearance of colors of pixels constituting an image represented by image data to be transmitted to an electronic device (inclusive of a cellular telephone); a deletion device for deleting, from a color palette table that includes a plurality of color palettes specifying colors of pixels constituting an image represented by image data, a color palette that corresponds to the color of a pixel for which the frequency of appearance calculated by the calculation device is less than a threshold value; and a transmitting device for transmitting the color palette table, from which the color palette has been deleted, and the corresponding image data to the electronic device in a form associated with each other.

The present invention also provides a control method suited to the above-described image data transmitting apparatus. Specifically, the method comprises the steps of: calculating frequency of appearance of the colors of pixels constituting an image represented by image data to transmitted to an electronic device; deleting, from a color palette table that includes a plurality of color palettes specifying colors of pixels constituting an image represented by image data, a color palette that corresponds to the color of a pixel for which the calculated frequency of appearance is less than a threshold value; and transmitting the color palette table, from which the color palette has been deleted, and the corresponding image data to the electronic device in a form associated with each other.

In accordance with the present invention, the frequency of appearance of the colors of pixels constituting an image represented by image data to be transmitted to an electronic device is calculated. Color palette corresponding to the colors of pixels whose calculated frequency of appearance is less than a threshold value (e.g., zero, or when the threshold value is regarded as zero) is deleted from a color palette table. Thus the amount of data in the color palette table is reduced.

The color palette table in which the amount of data has been reduced is transmitted to the electronic device in association with the corresponding image data. This reduces the amount of data sent to the electronic device and makes it possible to prevent a situation in which transmitted data cannot be received by the electronic device.

The apparatus preferably further comprises a determination device for determining whether the amount of data of the color palette table, from which the color palette has been deleted by the deletion device, and of the corresponding image data is greater than a receivable capacity of the electronic device; and a compression device (e.g., a device for reducing number of colors) for compressing the corresponding image data in response to a determination by the determination device to the effect that the amount of data is greater than the receivable capacity.

Thus, an amount of data that is the sum of the color palette table and image data transmitted to the electronic device can be reduced so that it is possible to prevent a situation in which the electronic device cannot receive the color palette table and image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3A is a color palette table before color palettes are deleted;

FIG. 3B is a color palette table after color palettes are deleted;

DESCRIPTION OF THE PREFERRED EMBODIMENT

A preferred embodiment of the present invention will now be described in detail with reference to the accompanying drawings.

Figure 1:
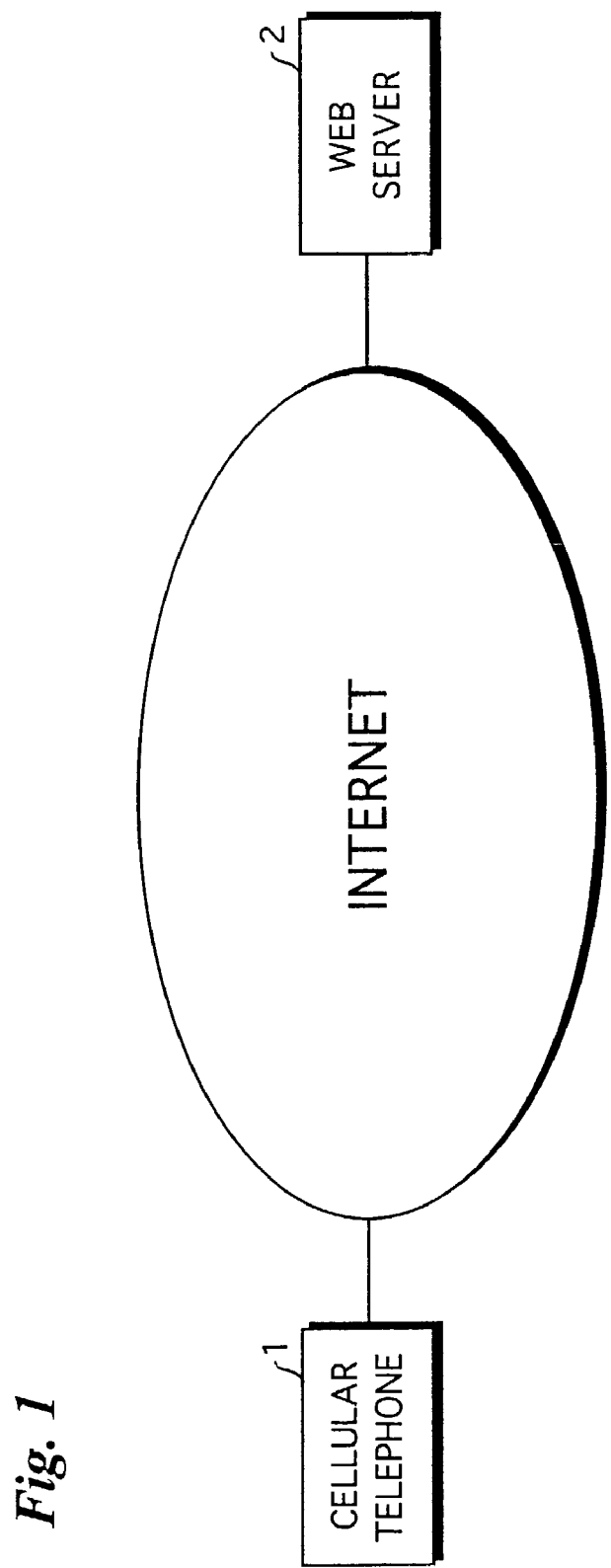
FIG. 1 is a diagram illustrating the general configuration of an image data communication system.

FIG. 1 is a diagram illustrating the general configuration of an image data communication system illustrative of an embodiment of the present invention.

A cellular telephone 1 and a Web server 2 are capable of communicating with each other via the Internet. Various files such as image files for displaying a Web page have been stored in the Web server 2. The Web server 2 transmits image files to the cellular telephone 1 in response to a request from the cellular telephone 1. It goes without saying that the Web server 2 includes a CPU, an interface for connecting to the Internet and for transmitting image data, a hard-disk drive, a display unit and a memory, etc.

The cellular telephone 1 includes a display unit. Be receiving an image file that has been transmitted from the Web server 2, an image (Web page) represented by this image file is displayed on the display screen of the display unit.

Though only the one cellular telephone 1 is shown in FIG. 1, it goes without saying that a larger number of cellular telephones and communication devices can be connected to the Web server 2 via the Internet.

In the image data communication system according to this embodiment, the color of a pixel constituting an image represented by image data is specified by a color palette number. Color palettes representing RGB ratios are stored in a color palette table in association with color palette numbers. In particular, in the image data communication system according to this embodiment, color pallets representing colors not used in an image represented by image data to be transmitted to a cellular telephone are deleted from the color palette table. This reduces the amount of data contained in the color palette table.

Figure 2:
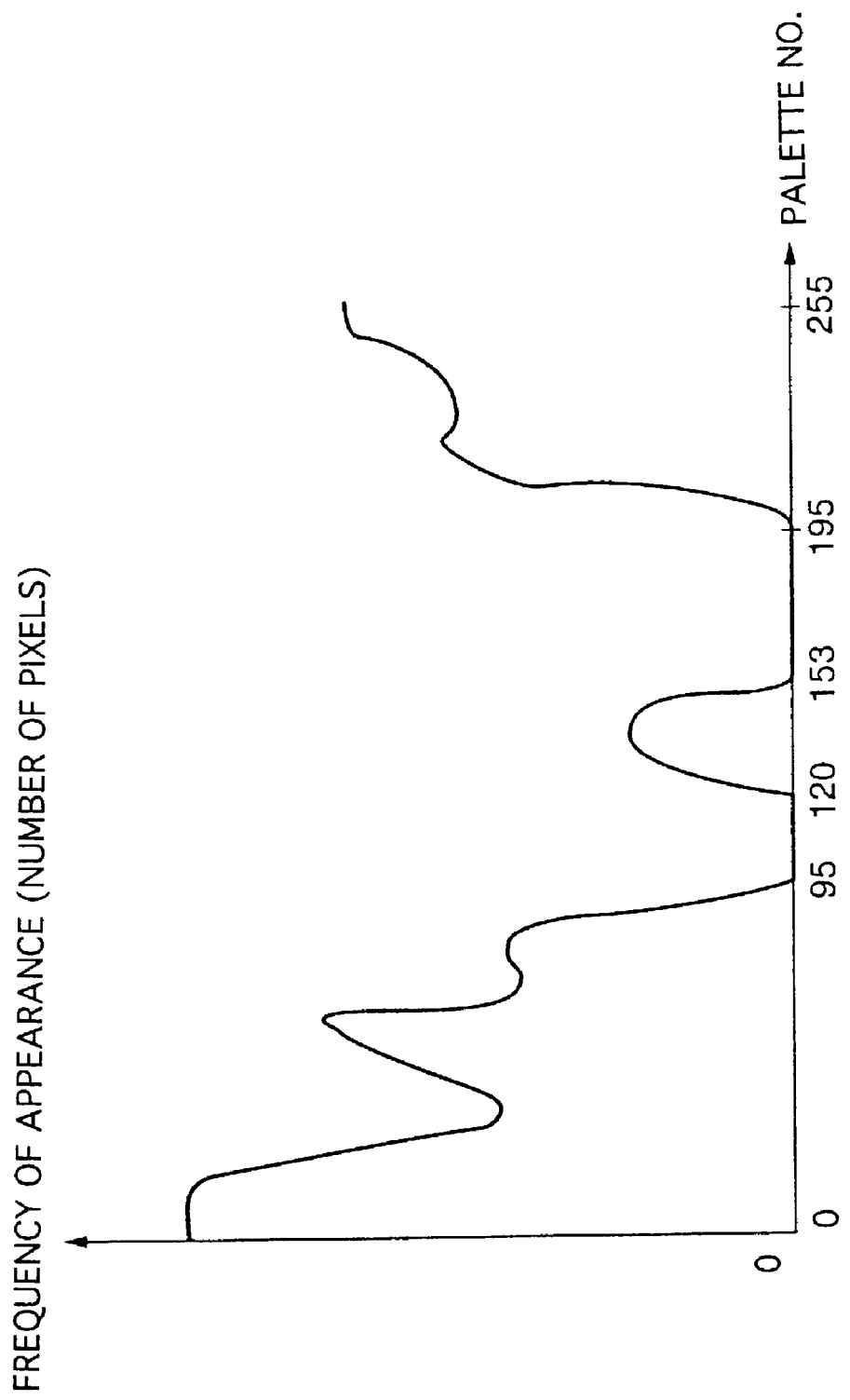
FIG. 2 is a histogram illustrating frequencies of appearance of pixels corresponding to palette numbers.

FIG. 2 is a histogram in which the frequencies of appearance of pixels constituting an image represented by image data that has been stored in the Web server 2 are represented by pallet numbers specifying the colors of the pixels.

The horizontal axis in FIG. 2 represents palette numbers (i.e., colors), and the vertical axis represents the frequencies of occurrence (numbers of pixels) of pixels whose colors are represented by the palette numbers.

In the example depicted in FIG. 2, pixels having colors represented by pallet numbers of 0 to 94, 121 to 152 and 196 to 255 appear in the image, but pixels having colors represented by pallet numbers of 95 to 120 and 153 to 195 do not. Therefore, color palettes corresponding to the palette numbers 95 to 120 and 153 to 195 are deleted from the color palette table, as will be described below.

FIGS. 3A and 3B illustrate examples of color palette tables.

FIG. 3A illustrates a color palette table before color palettes are deleted, and FIG. 3B illustrates a color palette table after color palettes are deleted.

As shown in FIG. 3A, palette numbers are stipulated in correspondence with RGB ratios. (When a color palette is deleted, the palette number is replaced, as will be described later. Palette numbers of color palettes before deletion shall be referred to as old palette numbers, and palette numbers of color palettes after deletion shall be referred to as new palette numbers.) Specifying a palette number (old or new) makes it possible to specify an RGB ratio (i.e., a color) by this palette number. For example, if an old palette number is number 0, then R, G, B are all 0's. The color of the pixel specified by the old palette number 0, therefore, is white (or black). If the old palette number is 1, then it will be understood that a color with only a slightly bluish tint is specified (i.e., that the pixel contains the color blue at a ratio of 5/255, and has red and green components of 0 each). In the example of FIG. 3A, palette numbers of 0 to 255 can be designated. This means that 256 colors can be specified.

If the colors of pixels are designated using the color palette table of FIG. 3A applied to the image having the histogram illustrated in FIG. 2, pixels of colors specified by the old palette numbers of 95 to 120 and 153 to 195 will not exist, as set forth above. Accordingly, the color palettes (RGB ratios) corresponding to the old palette numbers of 95 to 120 and 153 to 195 are deleted from the color palette table shown in FIG. 3A.

FIG. 3B illustrates a color palette table from which the color palettes corresponding to the old palette numbers of 95 to 120 and 153 to 195 have been deleted.

As a result of deleting the color palettes corresponding to the old palette numbers of 95 to 120 and 153 to 195, the number of color palettes is 187. Since the number of color palettes is reduced, the amount of data representing the color palette table is reduced. The palette numbers are replaced by the new palette numbers of 0 to 186.

Figure 4:
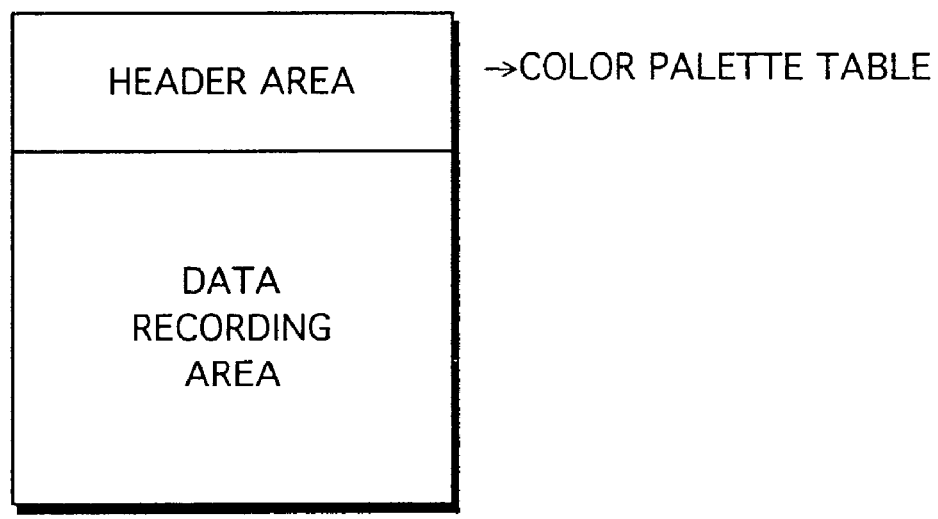
FIG. 4 illustrates the structure of an image file.

FIG. 4 is a diagram showing the structure of an image file transmitted from the Web server 2 to the cellular telephone 1.

The image file includes a header area and a data recording area.

Data representing a color palette table has been stored in the header area, as mentioned above, besides image-file management data. Image data the colors of which are stipulated by a color palette table has been stored in the data recording area.

Figure 5:
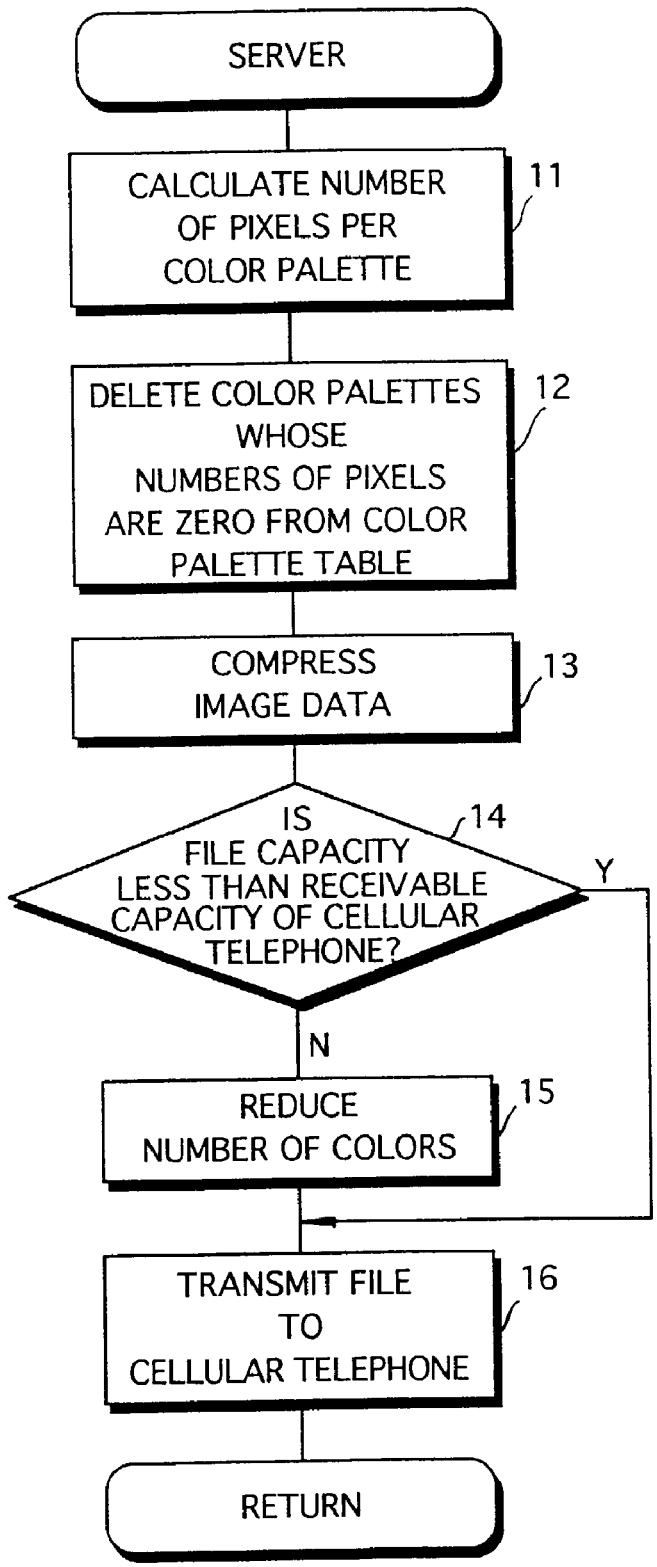
FIG. 5 is a flowchart illustrating processing executed by a Web server.

FIG. 5 is a flowchart illustrating processing executed by the Web server 2.

As shown in FIG. 2, the number of pixels constituting an image represented by image data (an image file) transmitted from the cellular telephone 1 to the Web server 2 is calculated for each color palette number (step 11). Color palettes corresponding to color palette numbers for which the numbers of pixels are zero are deleted from a predetermined color palette table (step 12).

Image data that has been placed in the image file (the image data per se that has been recorded in the data recording area of the image file) is compressed by a technique that conforms to the display specifications of the cellular telephone at the destination (step 13). For example, if the image file is to be transmitted to a cellular telephone of a certain cellular telephone company, then the image data will be compressed in accordance with the GIF (Graphics Interchange Format) suitable for displaying the image data on the cellular telephone of this company. If the image file is to be transmitted to a cellular telephone of another cellular telephone company, then the image data will be compressed in accordance with PNG (Portable Network Graphics) suitable for displaying the image data on the cellular telephone of this company.

It is determined whether the amount of data in the image file containing the color palette table data, from which the color pallets have been deleted, and the image data is less than the receivable capacity of the cellular telephone (step 14). If the amount of data in the image file is not less than the receivable capacity of the cellular telephone at the destination ("NO" at step 14), then processing for reducing the number of colors in the image (e.g., reducing the number of colors from 256 to 128) is executed (step 15), whereby the data in the image files undergoes further reduction (compression). The processing for reducing the number of colors may be realized by processing both the color palette table and the image data per se that has been recorded in the data recording area of the image file, or by processing only the image data per se and not the color palette table. If the amount data in the image file is less than the receivable capacity of the cellular telephone ("YES" at step 14), then the processing of step 15 is skipped.

The image file for which the amount of data has been reduced is transmitted from the Web server 2 to the cellular telephone 1 (step 16). Since the amount of data in the image file is reduced, it is possible to prevent a situation in which data cannot be received by the cellular telephone 1. Further, since the amount of data in the image file is reduced, communication time is shortened and, hence, communication expense can be reduced.

As many apparently widely different embodiments of the present invention can be made without departing from the spirit and scope thereof, it is to be understood that the invention is not limited to the specific embodiments thereof except as defined in the appended claims.

What is claimed is:

1. An image data transmitting apparatus comprising:
   a calculation device for calculating frequency of appearance of the colors of pixels constituting an image represented by image data to be transmitted to an electronic device;
   a deletion device for deleting, from a color palette table that includes a plurality of color palettes specifying colors of pixels constituting an image represented by image data, a color palette that corresponds to the color of a pixel whose frequency of appearance calculated by said calculation device is less than a threshold value;
   a transmitting device for transmitting the color palette table, from which the color palette has been deleted, and the corresponding image data to the electronic device in a form associated with each other;
   a determination device for determining whether the amount of data of the color palette table, from which the color palette has been deleted by said deletion device, and of the corresponding image data is greater than a receivable capacity of the electronic device; and
   a compression device for compressing said corresponding image data in response to a determination by said determination device to the effect that the amount of data is greater than the receivable capacity.

2. A method of controlling an image data transmitting apparatus, comprising the steps of:
   calculating frequency of appearance of the colors of pixels constituting an image represented by image data to transmitted to an electronic device;
   deleting, from a color palette table that includes a plurality of color palettes specifying colors of pixels constituting an image represented by image data, a color palette that corresponds to the color of a pixel for which the calculated frequency of appearance is less than a threshold value;
   transmitting the color palette table, from which the color palette has been deleted, and the corresponding image data to the electronic device in a form associated with each other;
   determining whether the amount of data of the color palette table, from which the color palette has been deleted by said deletion device, and of the corresponding image data is greater than a receivable capacity of the electronic device; and
   compressing said corresponding image data in response to a determination by said determination device to the effect that the amount of data is greater than the receivable capacity.

* * * * *